Jan. 20, 1959 D. MITCHELL ET AL 2,869,964

MAGNETIC RECORDING SYSTEM

Filed March 3, 1954 4 Sheets-Sheet 1

INVENTORS D. MITCHELL
E. VROOM

BY William F. Simpson

ATTORNEY

Jan. 20, 1959

D. MITCHELL ET AL 2,869,964

MAGNETIC RECORDING SYSTEM

Filed March 3, 1954

4 Sheets-Sheet 2

INVENTORS D. MITCHELL
E. VROOM
BY William F. Simpson
ATTORNEY

Jan. 20, 1959

D. MITCHELL ET AL 2,869,964

MAGNETIC RECORDING SYSTEM

Filed March 3, 1954

4 Sheets-Sheet 3

INVENTORS D. MITCHELL
E. VROOM
BY William F. Simpson
ATTORNEY

Jan. 20, 1959 D. MITCHELL ET AL 2,869,964

MAGNETIC RECORDING SYSTEM

Filed March 3, 1954 4 Sheets-Sheet 4

INVENTORS D. MITCHELL
E. VROOM

BY William F. Simpson

ATTORNEY

United States Patent Office 2,869,964

Patented Jan. 20, 1959

2,869,964

MAGNETIC RECORDING SYSTEM

Doren Mitchell, Martinsville, N. J., and Edward Vroom, Brooklyn, Conn., assignors to Bell Telephone Laboratories, Incorporated, New York, N. Y., a corporation of New York Application March 3, 1954, Serial No. 413,784

17 Claims. (Cl. 346—74)

Figure 1:
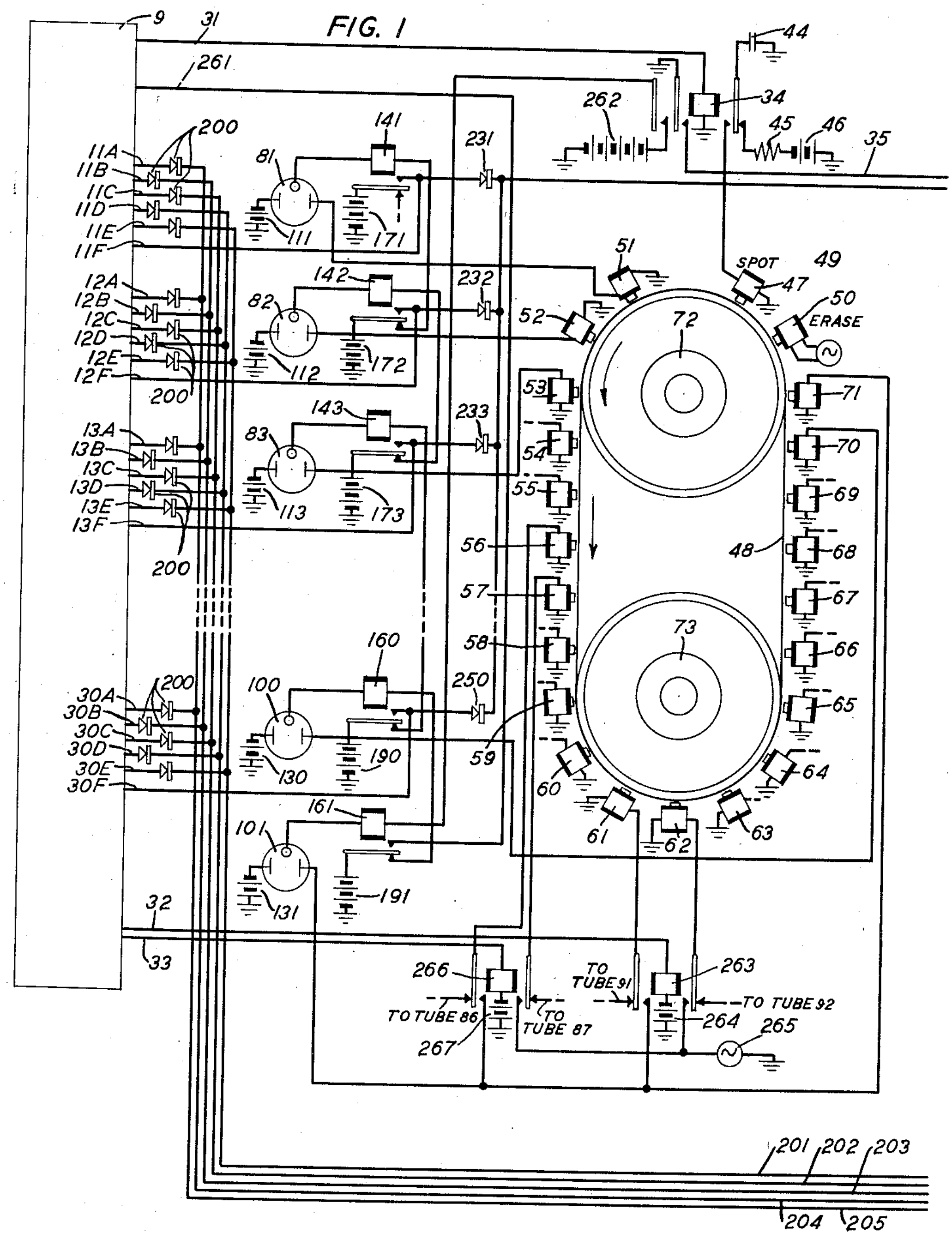

This invention relates to magnetic tape recorders, and more particularly to magnetic tape recording systems employing devices for delaying and storing the recording of information until the magnetic recording tape has accelerated from rest to recording speed.

Magnetic tape recorders are utilized in automatic telephone systems for storing call or message information. By transforming the call or message information into electrical pulses and applying these pulses to a high speed magnetic tape, the information is readily accessible for reading or reproduction, as, for example, in automatic message accounting systems of the type disclosed in Patent 2,594,495 granted April 29, 1952, to J. B. Retallack. In recording a sequence of calls, it is of course desirable to utilize the entire surface of the magnetic tape and avoid long vacant spaces resulting from considerable intervals between calls.

It is an object of the present invention to provide magnetic recording apparatus which is operated on a start-stop basis to avoid wasting tape between calls.

The magnetic tape is accelerated to recording speed when the message to be recorded is received. To retain the initial part of the message information during the acceleration of the tape, a delay or storage device is advantageous to provide for sufficient time to accelerate the recording tape to recording speed.

A feature of the invention relates to the provision of means for storing incoming information or messages and then for recording the information upon a magnetic tape after it has accelerated to recording speed.

Still another feature of the invention pertains to the provision of a delay between the initial reception of the message to be recorded, and the recording of the message on a high speed recording tape.

The present invention accomplishes the foregoing objects by providing a magnetic recording system having a register circuit which supplies a multidigital coded input. In addition to the coded input, the register circuit provides a start pulse and an indication of how many digits are to be recorded. The start pulse effects the energization of a digit scanner and a clutch mechanism associated with a recording tape. As the recording tape is accelerated to recording speed, the digit scanner functions as a delay circuit and also commences arranging the multidigital coded input on a sequential or pulse time modulation basis. The start pulse to the digit scanner provides for a magnetic signal or spot on a continuously moving digit tape. The digit tape moves adjacent pick-up magnets which are each associated with the coded input of one of the digits from the register. As the spot passes adjacent one of the pick-up magnets, an associated receiving tube is energized to provide the coded input of the associated digit to a fast or unit scan device. The fast scan device sequentially arranges the signals of each digit and controls the recording apparatus associated with the recording tape. The fast scan device completes an operating cycle as the magnetic spot on the digit tape passes between two adjacent pick-up magnets. By the time the fast scan device is operated to control the recording apparatus, the final recording tape has been accelerated to recording speed by the clutch mechanism.

It is still another object of the present invention to provide a magnetic recording apparatus wherein simultaneously received information is sequentially recorded as pulse time modulation signals.

Still another feature of the invention relates to the provision of magnetic delay and recording apparatus wherein the relay apparatus is conditioned by simultaneously received multielement input signals, to provide the multielement signals on a sequential, or pulse time basis, to the recording apparatus.

Figure 2:
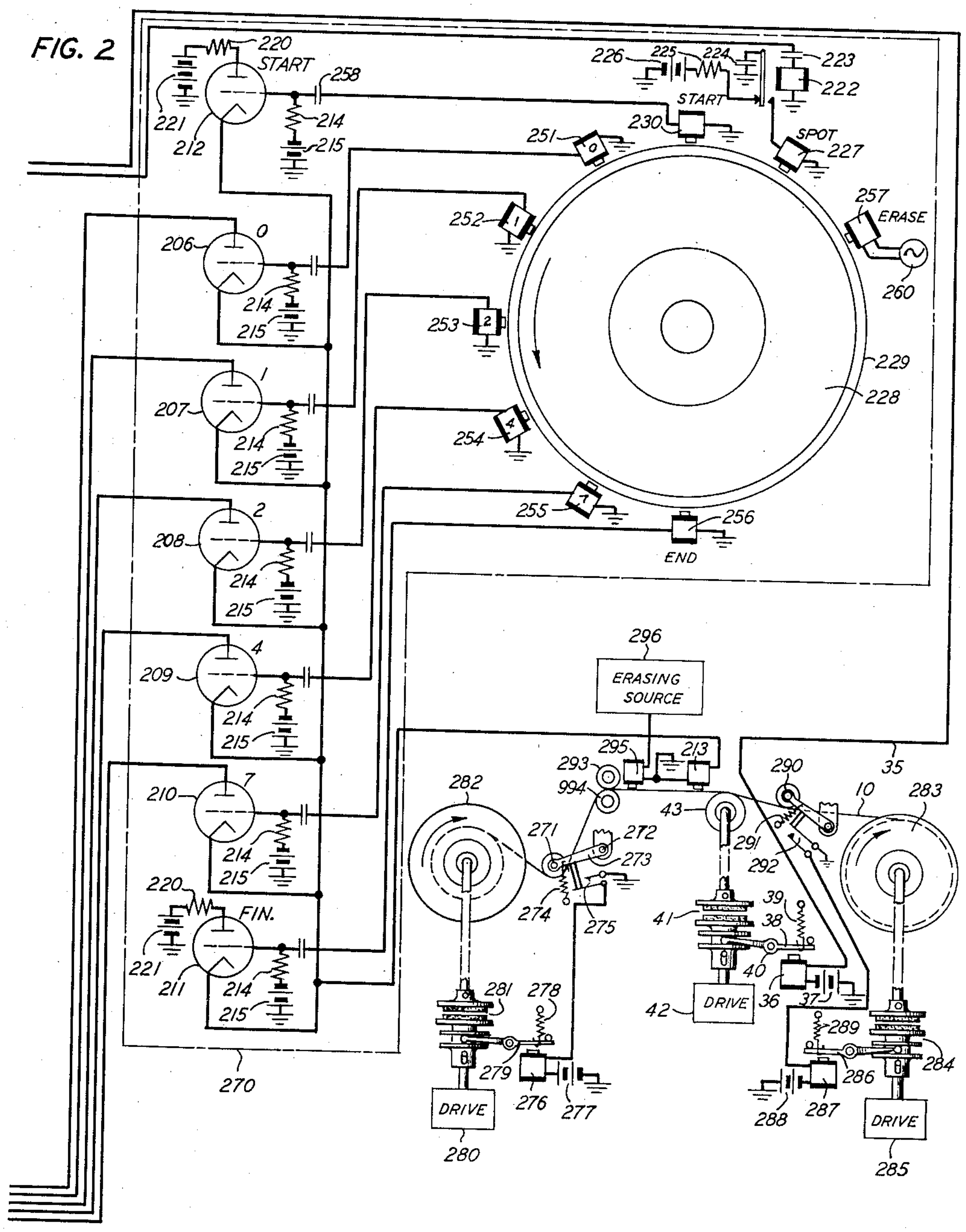
Figure 3:
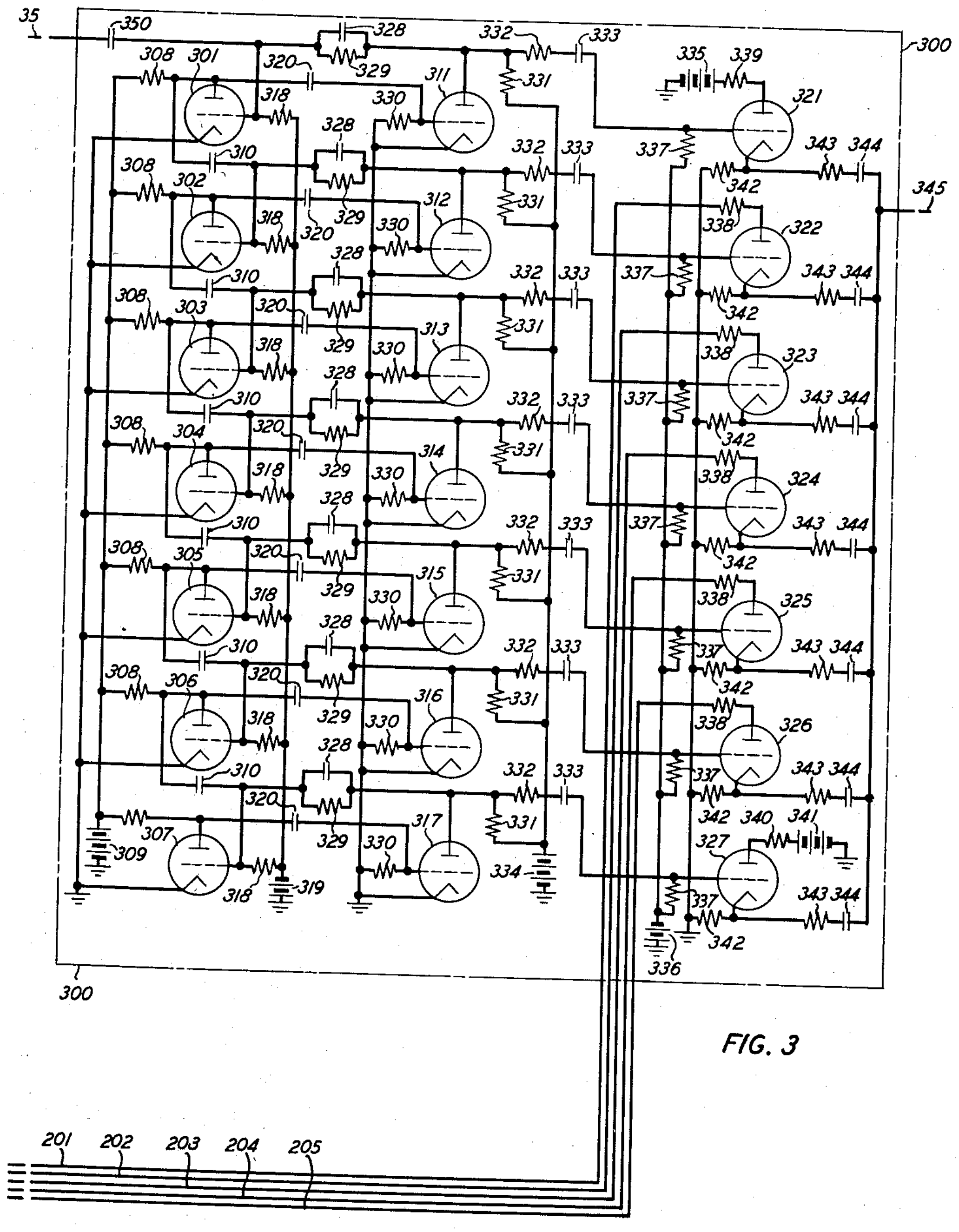
Figure 4:
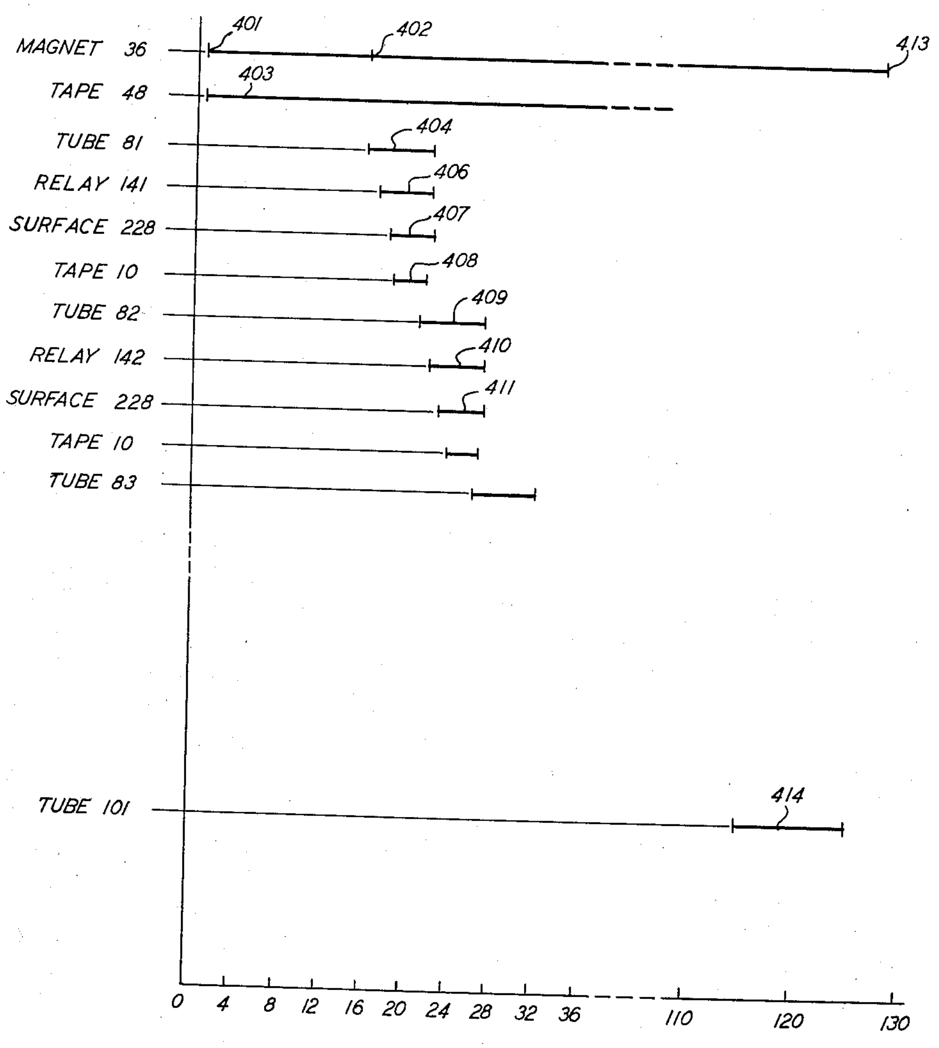

Further objects, features and advantages will become apparent to those skilled in the art upon consideration of the following description taken in conjunction with the drawings wherein:

Fig. 1 illustrates the digit scanner illustrative of the present invention;

Fig. 2, which should be arranged at the right of Fig. 1, illustrates the magnetic fast or unit scan device and the recording tape and associated apparatus of the present invention;

Fig. 3 is a circuit diagram of an electronic fast or unit scan circuit which can be substituted for the magnetic fast scan device shown in Fig. 2; and Fig. 4 is a time chart illustrating the operation of the various components of a system constructed in accordance with the present invention.

The signals to be transcribed to the recording tape 10 in Fig. 2 correspond to closures of relays or contacts, not shown, in the register 9, representing the digits of calling line and called line numbers or other such similar information. Each digit to be recorded utilizes a group of six input leads such as 11A through 11F or 12A through 12F, etc. The digits are coded on a two-out-of-five basis utilizing five leads 11A through 11E, etc. corresponding to each input digit. The present invention is not restricted to the utilization of a coded digital input, or to the particular code indicated, but is applicable to any input information that can be characterized by two sets of conditions, as on or off, plus and minus, etc.

In the specific embodiment of the present invention an input of twenty possible digits from the register 9 is provided. When the signals from register 9 are to be impressed upon the input leads 11A through 11E, 12A through 12E, etc., through 30A through 30E, a start signal and an indication as to how many digits are to be entered are provided. The start signal is provided through lead 31 from register 9 to operate the start relay 34. The operation of relay 34 closes a circuit from ground through its left inner contact and lead 35 to the magnetic clutch magnet or relay 36, shown in Fig. 2, which is also connected to the battery 37. The energization of relay 36 attracts the armature 38 which is resiliently supported by the spring 39. The armature 38 rotates about the pivot 40 causing the clutch 41 to engage so that the drive or motor unit 42 is coupled to the driving wheel 43 to start the movement of the recording tape 10. The tape 10 has one turn about the wheel 43 which moves it to the right. As the tape 10 is moved to the right by wheel 43, the idler 271 is rotated about the pivot 272 on the arm 273 against the tension of spring 274. As the slack portion of tape 10 about idler 271 is pulled up it passes between guide rollers 293 and 294 adjacent the erase coil 295, record coil 213 and idler 290 to the take-up coil 283. Upon movement of idler 271, contact 275 is closed and ground is applied to relay 276 which is also connected to battery 277. The energization of relay 276 causes the clockwise rotation of armature 279 against the spring 278 to engage clutch 281. When clutch 281 is engaged, the drive mechanism 280 rotates a storage wheel 282 in a clockwise manner. The take-up reel 283 is rotated in a similar manner by the drive mechanism 285 through clutch 284 when the idler 290 is lowered, or rotated in a counterclockwise manner. The idler 290 is lowered when slack tape 10 is provided by the rotation of wheel 43 as described above. As the idler 290 is lowered, contacts 292 close and provide a connection from ground through relay 287 to battery 288. The energization of relay 287 actuates the armature 286 against spring 289 to engage clutch 284. The idler mechanisms comprising idlers 271 and 290 are light so that the amount of mass to be accelerated by the tape drive 42 is comparatively small. Either or both of the reels 282 and 283 may have considerable inertia due to the tape 10 wound therein, and clutches 281 and 284 may slip as the tap 10 is accelerated. The idlers 271 and 290, however, are so positioned and the slack in tape 10 is such that the drive 42 need not rotate the wheel 282. On Fig. 4, which illustrates the sequence of operation of the present invention, the clutch magnet 36, as indicated at 401, is energized approximately 1 millisecond after the start pulse appears on lead 31 from the register 9. The delay or time required from closure of ground to magnet 36 to movement of tape 10 at recording speed is approximately 15 milliseconds, as indicated on Fig. 4 between points 401 and 402. The tape 10 is cleaned or erased before it passes adjacent coil 213 by the erase magnet 295 which is connected to the erasing source 296.

The operation of start relay 34, described above, which is responsive to the start pulse from register 9, discharges the capacitor 44 which was charged by the connection through the right transfer contact and resistor 45 to battery 46. Capacitor 44 discharges through the operated transfer contact of relay 34 and the winding of the spot coil 47 to ground. The energization of the spot coil 47 places a magnetic spot or signal on the continuously moving digit tape 48 at essentially the same time the clutch magnet 36 is energized, as indicated on line 403 in Fig. 4. The tape 48 is part of a digit scanner 49 which additionally comprises twenty-two coils 50 through 71 and the spot coil 47, described above, positioned in proximity with the tape 48. The coil 50 is an erase coil and the coils 51 through 71 are digit pick-up coils, with one digit pick-up coil being provided for each of the twenty digits to be recorded. The dimensions of the pulleys 72 and 73 which support the tape 48, the driving speed, and spacing of the pick-up coils 51 through 71 are such as to scan at the rate of 5 milliseconds per digit as is hereinafter described. The dimension spacings and speeds described are merely illustrative of the present invention and may be modified to provide for a greater or lesser delay of the recording upon tape 10.

One terminal of each of the pick-up coils 51 through 71 is connected to ground and the other to the starting electrode of associated cold cathode tubes 81 through 101, respectively. The other or left starting electrodes of tubes 81 through 101 are connected respectively to the negative batteries 111 through 131 which normally bias the tubes 81 through 101 below the necessary starting or ionizing voltage. The main electrodes of the tubes 81 through 101 are connected respectively through the windings of the fast-operating relays 141 through 161 and through the transfer contact of the next adjacent one of relays 141 through 161, to the positive potential sources 171 through 191. The main electrode of tube 81, for example, is connected through the winding of relay 141 and the unoperated or normal transfer contact of relay 142 to battery 172. The operation of each of the relays 141 through 161 in this manner opens the circuit to its associated battery 171 through 191 to release the preceding one of the relays 141 through 161.

The magnetic spot which is placed upon the tape 48, as described above, by the coil 47 when relay 34 operates, travels at a rate of approximately 37½ inches per second and passes adjacent the coil 51 in approximately 15 milliseconds. As the spot passes adjacent coil 51, it generates a voltage in coil 51 which causes tube 81 to ionize. Current flows from ground through battery 111, across the starting gap of tube 81, and through coil 51 to ground. Tube 81 ionizes approximately 15 milliseconds after the magnetic spot is placed upon tape 48, as indicated by line 404 in Fig. 4. The ionization in tube 81 transfers across the main gap, from the main electrode to the left starting electrode, and causes the operation of relay 141 which is connected to the plus 130-volt potential source 172, as described above. Line 406 in Fig. 4 illustrates the operation time of relay 141. The operation of relay 141 connects battery 171 to lead 11F which is connected to the register 9. The positive potential applied upon lead 11F causes the register 9 to apply positive potentials to the leads 11A through 11E to overcome a negative bias maintained on diodes 200 (not shown). The coding is on a two-out-of-five basis, as is well known in the art, with the leads 11A through 11E being designated, respectively, 7, 4, 2, 1, 0. The input leads 11A through 11E, 12A through 12E, etc. through 30A through 30E are all connected respectively through diodes 200 to the common leads 201 through 205, and thence to the plates of the triodes 206′ through 210 in the unit scanner 270.

The unit scanner 270 has seven triode tubes 206 through 212 with the five tubes 206 through 210 being the common digit tubes, the tube 212 being the start tube, and the tube 211 being the finish tube, as is hereinafter described. The cathodes of the seven tubes 206 through 212 are connected to the ground recording coil or magnet 213 described above which is positioned adjacent the final record tape 10. The grids of tubes 206 through 212 are biased to cut-off respectively through the resistors 214 by the negative potential sources 215. The anodes of start tube 212 and finish tube 211 are connected respectively through resistors 220 to the positive potential sources 221.

When relay 141 operated, as described above, responsive to the energization of coil 51 by the magnetic spot on tape 48, it connected battery 171 through lead 11F to register 9. Responsive to the positive potential upon lead 11F, the two information bearing leads of leads 11A through 11E are energized to provide a positive potential upon two out of five of the anodes of tubes 206 through 210. The operation of relay 141 also connects the positive potential of battery 171 through the varistor 231 to capacitor 223 to operate relay 222. Relay 222 operates for a short time and transfers capacitor 224 from its connection through resistor 225 to the positive potential source 226 to the spot coil 227. The spot coil 227 is positioned adjacent a fast or unit scanner disc 228 which has an outer magnetic surface 229. The disc 228 is a continuously rotating disc having its surface 229 positioned adjacent the spot coil 227 as described above; a start pick-up magnet 230; five digit pick-up magnets 251 through 255; an end or finish pick-up magnet 256; and an erase magnet 257. Relay 222 remains operated as spot coil 227 is energized and then releases to recharge the capacitor 224. The magnetic spot that is applied to the surface 229 of disc 228 by the spot coil or magnet 227 passes sequentially beneath coils 230 and 251 through 257. The duration of the magnetic spot on surface 228 is shown as line 407 in Fig. 4. When the spot applied by the magnet 227 passes adjacent the coil 230, it energizes the coil 230 to supply a positive pulse through the capacitor 258 to the grid of the start tube 212 as described above. The potential supplied from the coil 230 is sufficient to momentarily trigger the tube 212 and increase the potential at its cathode. The cathode of the tube 212 and the tubes 206 through 211 as well, as described above, are connected to the recording coil 213. When tube 212 triggers, the potential at its cathode increases thereby energizing the coil 213 which spots the moving tape 10 described above. The tape 10, as described above and illustrated in Fig. 4, is driven at recording speed of approximately 20 inches per second in approximately 15 milliseconds after the energization of relay 36. The relay 36 was energized, as described above, at the commencement of the sequence of operations. A delay of approximately 17 milliseconds is provided in this manner from the time that relay 36 is energized to the time that relay 213 is energized to commence spotting the magnetic tape 10. This delay is effected mainly by the time that it takes for the spot provided by the coil 47 in Fig. 1 upon tape 48 to move beneath the coil 51. The delay time also includes the time for the ionization of tube 81; transfer of ionization therein; the operation of relays 141 and 222; the energization of coil 227; and the time for the magnetic spot produced by the coil 227 to move under start coil 230. The spot produced by coil 227 passes sequentially adjacent the coils 230 and 251 through 257. Two of the plates of tubes 206 through 210, as described above, have potential provided thereto and permanent plate potential is provided for start tube 212 and finish tube 211. When the magnetic spot on disc 228 passes adjacent the pick-up coils 251 through 256, the voltage generated therein overcomes the bias on the grids of their associated tubes 206 through 210 and causes current pulses to flow through the record coil 213 to magnetically spot the final record tape 10. As the magnetic spot on disc 228 rotates adjacent the seven coils 230 and 251 through 256, four spots are provided to the tape 10; the start spot; two spots in accordance with the two-out-of-five code; and the finish or end spot. If, for example, there is a signal on leads 201 and 204, a signal is placed on tape 10 at times corresponding to the first and fourth pulse intervals. The speed of rotation of the fast or unit scanner disc 228 is sufficient to scan the seven elements of a digit in 3½ milliseconds. One-half millisecond after the spot passes the end coil 256 the spot is erased by the erase coil 257 which has connected thereto a source of relatively high frequency current 260. The surface 228 of disc 229 retains the magnetic spot for 4 milliseconds as illustrated by line 407 in Fig. 4. The record tape 10 is spotted during the first 3½ milliseconds of the energization or spotting of surface 222, as illustrated by line 408 in Fig. 4. A succeeding spot is applied, as is hereinafter described, to the unit scanner disc 228 when the tube 82 in Fig. 1 is ionized to record the second digit.

Returning to the digit scanner 49 shown in Fig. 1, the sequence of operations described above for recording the first digit on the final record tape 10 is performed during the time that the spot provided by the coil 47 is traveling between the pick-up coils 51 and 52, which is 5 milliseconds in duration. Five milliseconds after leaving coil 51 the spot passes adjacent coil 52, and a pulse is generated in coil 52 which ionizes tube 82 and causes relay 142 to operate, as illustrated by lines 409 and 410 in Fig. 4. The operation of relay 142 releases relay 141 by moving battery 172 therefrom. The release of relay 141 removes battery 171 from its connection to register 9, thereby removing the positive potential representing the two out of five code which is applied to the anodes of tubes 206 through 210 over the leads 201 through 205 and also from its connection to relay 222 as described above. Relay 222, as described above, was only momentarily energized when battery 171 was connected thereto due to the connection through the capacitor 223. When relay 142 operates, it also connects the battery 172 through varistor 232 and capacitor 223 to relay 222, causing it once again to operate. The operation of relay 222, as described above, energizes the spot coil 227 to magnetically spot the surface 229 of the unit scanning disc 228. Line 411 illustrates the duration of the magnetic spot of surface 229 for the second digit. The operation of relay 142 also supplies a positive potential from source 172 through lead 12F to register 9 which provides positive potential on a two-out-of-five basis through the leads 12A through 12E and varistors 200 to the leads 201 through 205. Potential is applied to the leads 12A through 12E by register 9 in accordance with the second digit to be recorded upon the final record tape 10. The recording of the second digit proceeds in a similar manner as described above in reference to the first digit, with the spot provided by coil 227 passing adjacent the coils 230 and 251 through 256 which causes the energization of the record coil 213 in accordance with the plate potentials upon tubes 206 through 212. The sequence of events is repeated for each of the twenty digits as the spot on tape 48 passes adjacent the coils 53 through 70 is provided for the pulse time modulation upon tape 10.

Approximately 5 milliseconds after the spot passes adjacent coil 70, it causes a voltage pulse in coil 71 to ionize tube 101 and operate release relay 161. The main electrode of tube 101 is connected through the winding of relay 161 and the left operated contact of relay 34 to battery 262. The operation of relay 161 causes the release of relay 160 and connects battery 191 to the release lead 261 to operate a disconnect relay, not shown, in the register 9. Tube 101 and relay 161 remain operated until the release of relay 34 which occurs responsive to the operation of the disconnect relay, not shown, in register 9. Line 414 in Fig. 4 illustrates the duration of ionization of tube 101. When relay 34 releases, it opens the connection from battery 262 through the winding of relay 161 to the main electrode of tube 101, releasing relay 161 and extinguishing tube 101. The release of relay 34 also releases the clutch magnet 36 which allows the clutch 41 to disengage. Point 413, in Fig. 4, indicates the deenergization of magnet 36. The tape 10 slows down and stops approximately 15 milliseconds after the ionization of tube 101, described above, which allows sufficient time for the completion of the twentieth digit to be recorded on tape 10. When the clutch 41 is disengaged, the continued operation of drive 285 through the engaged clutch 284 raises the idler 290. The raising of idler 290 opens contact 292 which opens the energizing path for clutch magnet 287. The deenergization of magnet 287 disengages the clutch 284. In a similar manner, the continued rotation of wheel 282 by drive 280 allows the idler 271 to lower and open the contacts 275. The opening of contacts 275 opens the operating path of magnet 276 to release the clutch 281.

At the commencement of the sequence of operations, as briefly described above, an indication may be provided by leads 32 and 33 from register 9 as to whether five, ten or twenty digits are to be recorded upon tape 10. In the sequence of operations described above, no such indication was provided. If either lead 32 or 33 is grounded, as is hereinafter described, the magnetic spot provided upon the digit scanner tape 48 is erased after five or ten digits have been scanned and tube 101 is operated to effect the release of the register 9, and subsequently the relay 34, to restore the system to normal. If neither of the leads 32 and 33 is grounded, the digit scanner 49 functions as described above and twenty digits are recorded upon tape 10. If lead 32 is grounded, relay 263 is operated through a path from ground on lead 32 and the winding of relay 263, through battery 264, and then to ground. The operation of relay 263 transfers pick-up coil 62 from the start electrode of tube 92 to the high frequency source 265, and also transfers pick-up coil 61 from the start electrode of tube 91 to the start electrode of tube 101. The spot on tape 48, therefore, causes the ionization of tube 101 after ten digits to effectively return the system to normal. Thereafter the spot is erased by coil 62.

When lead 33 is grounded, relay 266 operates over a path through battery 267 to transfer pick-up coil 56 from the start anode of tube 86 to the start anode of tube 101 and to transfer pick-up coil 57 from the start anode of tube 87 to the high frequency source 265. In this manner, after five digits, tube 101 is ionized and the system is returned to normal. The spot on tape 48 is erased by coil 57.

Fig. 3 illustrates an electronic unit scanning circuit 300 which can be substituted for the mechanical unit scanning circuit 270, shown in Fig. 2. The operation of the electronic scanning circuit 300 is analogous to that of the mechanical scanner 270 in that it receives a pulse upon the operation of relay 34 through lead 35 which causes it to scan the five digit unit leads 201 through 205 and to sequentially place spots on the final record tape 10 corresponding to the two-out-of-five code indicated by the energization of two out of five of the leads 201 through 205. The electronic scanner 300 magnetically spots the recording tape 10 with a start and a finish spot, in a similar manner as provided by the mechanical scanner 270.

The electronic scanner 300 consists of three columns of triode tubes with the tubes 301 through 307 being arranged in a first column; the tubes 311 through 317 being arranged in a second column; and the tubes 321 through 327 being arranged in a third column. The first row of tubes, comprising tubes 301, 311 and 321, is associated with the start indication; the next five rows of tubes are associated respectively with the leads 201 through 205; and the last or seventh row of tubes 307, 317 and 327 is associated with the finish or end indication. The tubes 301 through 307 and 311 through 317, as is hereinafter described, serve as timers to time the rate of advance of the pulse received through lead 35 and to generate a voltage pulse for operating the gate tubes 321 through 327. In the normal circuit condition, before the pulse is received through lead 35 from the digit scanner 49, the tubes 311 through 317 are conductive or pass plate current due to the connection of their anodes through the resistors 331 to the positive potential sources 334, and the connection of their grids through resistors 330 to ground. Tubes 301 through 307 are non-conductive, due to the negative bias applied to their grids through the resistors 318 from the negative potential source 319.

As is hereinafter described, when a pulse is entered through lead 35 and the capacitor 350, tube 301 becomes conductive and tube 311 becomes non-conductive to provide a pulse to operate tube 321. The anodes of tubes 301 through 307 are connected through capacitors 320, respectively, to the grids of tubes 311 through 317, and the cathodes of tubes 301 through 307 are connected to ground. The anodes of tubes 301 through 307 are also connected to the positive potential source 309 through the resistors 308, and the grids of tubes 311 through 317 are also connected through the resistors 330 to ground.

When tube 301 is non-conductive due to the high negative grid bias, its anode is at plus 130 volts, and capacitor 320 is fully charged through the resistors 308 and 330. The grid of tube 301 is connected between the resistors 329 and 318, which, with resistor 331, form a voltage divider circuit. When plate current is flowing through tube 311, the resistors 318, 329 and 331 provide for the sufficient negative bias upon the grid of tube 301, to prevent conduction therethrough. Capacitor 328, which is coupled across the resistor 329, described above, is charged to a voltage equal to that generated across resistor 329 by the current therethrough. The grid of tube 311 is at the same potential as the cathode thereof or at ground potential. Plate current through tube 311 provides for a potential at the plate of tube 311 which is somewhat lower than the potential of source 334, due to the voltage drop across the resistor 331.

When a high voltage positive pulse is impressed upon lead 35, it is transmitted through the coupling capacitor 350, as described above, to the grid of tube 301 to alter the grid bias and permit plate current through tube 301. The voltage at the plate of tube 301, therefore, decreases and causes capacitor 320 to discharge and lower the potential upon the grid of tube 311. The drop in potential upon the grid of tube 311 reduces the plate current therethrough and increases its plate potential to provide for a positive pulse through the resistor 332 and coupling capacitor 333 to the grid of tube 321. The plate of tube 321, which is the start gate tube, is connected to the positive potential source 335 through the resistor 339. The grids of tube 321 and of tubes 322 through 327, as well, are connected to ground through the resistors 337. The cathodes of tubes 321 through 327 are connected to ground through the resistors 342, and to the lead 345 through resistors 343 and capacitors 344, respectively. The lead 345 is connected to the record coil 213 described above. When the potential upon the grid of tube 321 increases, the tube becomes conductive with the potential at its cathode increasing to cause the energization of coil 213 which impresses a corresponding signal or start spot on recording tape 10.

The increase in potential upon the anode of tube 311, when it ceases to conduct, causes a greater current flow through resistors 331, 329 and 318 to charge the capacitor 328. As capacitor 320 discharges, the grid of tube 311 again assumes a near cathode potential and plate tube 311 returns to its original conductive condition. As tube 311 becomes conductive, the voltage drops at its anode which causes a readjustment of the current and voltages in the voltage divider circuit comprising the resistors 331, 329 and 318. The grid of tube 301 again assumes a high negative bias which prevents plate current through tube 301. The cessation of plate current through tube 301 increases the plate potential thereof to transmit a pulse through the capacitor 310 to the grid of tube 302. As tube 301 returns to its normal condition, a positive pulse is applied to the grid of tube 302, and a similar sequence of events proceeds in accordance with the tubes 302, 312 and 322.

The digit gate tubes 322 through 326 have plate potential applied through the resistors 338 in accordance with the two-out-of-five energization of the leads 201 through 205 from the digit scanner 49. When the positive pulse is therefore sequentially applied to the grids of tubes 322 through 326, only the tubes having plate potential become conductive and provide a pulse through lead 345 to energize the record coil 213. The last row of tubes 307, 317 and 327 are the finish tubes and provide a positive pulse through lead 345 upon their operation for each digit, as the anode of tube 327 is connected to the positive potential source 341 through resistor 340. In effect, the tubes 301 through 307 in the first column and the tubes 311 through 317 in the second column form seven, single-shot multivibrator circuits. The constants of the various circuit components are set so that each row or timing cycle requires one-half a millisecond, or 3½ milliseconds for an entire digit, which is the time required by the mechanical scanner 270 shown in Fig. 2.

While we have shown a system using twenty steps in the slow scanner or digit scanner 49, and five, excluding the start and end signals, in the fast or unit scanners 270 and 300, these limitations are not to be considered restrictive requirements. Various modifications may be provided utilizing the principles of the present invention, as for example, a ten slow and ten fast scan scheme could be used as well. It is to be understood, therefore, that the above-described arrangements are only illustrative of the application of the principles of this invention. Numerous other arrangements may be devised by those skilled in the art without departing from the spirit and scope of the invention.

What is claimed is:

1. A recording system comprising a register circuit for simultaneously providing a start signal and a plurality of sets of coded signals; a digit scanner connected to said register circuit having a magnetic device energized by said start signal from said register circuit; circuit means controlled by said magnetic device for sequentially scanning said sets of coded signals from said register circuit and for providing coded sets of outputs corresponding thereto; a unit scanning circuit controlled by said circuit means for sequentially scanning each of the sets of outputs from said circuit means and for providing a coded signal output corresponding thereto; and a recording device controlled by said start signal from said register circuit and by said coded signal output from said unit scanning circuit.

2. A recording system in accordance with claim 1 wherein said unit scanning circuit comprises a closed loop magnetic surface, a plurality of pick-up coils positioned adjacent said surface, and means for providing relative motion between said surface and said coil to complete a cycle of relative motion before a succeeding set of outputs is provided by said circuit means.

3. A recording system in accordance with claim 1 wherein said recording device comprises a clutch mechanism controlled by said start signal from said register circuit, a record coil controlled by said coded signal output from said unit scanning circuit and a magnetic tape positioned adjacent said record coil and controlled by said clutch mechanism.

4. A recording system in accordance with claim 2 wherein said unit scanning circuit comprises in addition a plurality of circuit components conditioned by said circuit means of said digit scanner and connected respectively to said pick-up coils, and a spot coil positioned adjacent said surface and controlled by said circuit means.

5. A recording system in accordance with claim 4 wherein said recording device comprises a clutch mechanism controlled by said start signal from said register circuit, a record coil connected to and controlled by said plurality of circuit components, and a magnetic tape positioned adjacent said record coil and controlled by said clutch mechanism.

6. A start-stop recording device comprising an input circuit for simultaneously providing sets of coded signals making up an entry and an indication of the number of sets in the entry; a first delay circuit connected to said input circuit for sequentially arranging said sets of coded signals; a second delay circuit connected to and controlled by said first delay circuit for sequentially arranging the coded signals in each of said sets; apparatus for recording said sequentially arranged coded signals; and means responsive to said input circuit in accordance with said indication and associated with said recording apparatus to control said recording apparatus on a start-stop basis.

7. A start-stop recording device comprising an input circuit for simultaneously providing sets of coded signals making up an entry and an indication of the number of sets in the entry, a first delay circuit connected to said input circuit for sequentially arranging said sets of coded signals, a second delay circuit connected to and controlled by said first delay circuit for sequentially arranging the coded signals in each of said sets, and recording apparatus controlled by said input circuit in accordance with said indication of the number of sets in the entry to operate on a start-stop basis for recording said sequentially arranged coded signals from said second delay circuit, said first and said second delay circuits comprising continuously moving magnetic surfaces and signal coils positioned adjacent said surfaces, and said recording apparatus comprising a magnetic tape, and accelerating means controlled by said input circuit for operating said magnetic tape only when said sets of coded signals are provided by said input circuit.

8. A start-stop recording device comprising an input circuit for simultaneously providing sets of coded signals making up an entry and an indication of the number of sets in the entry, a first delay circuit connected to said input circuit for sequentially arranging said sets of coded signals, a second delay circuit connected to and controlled by said first delay circuit for sequentially arranging the coded signals in each of said sets, and recording apparatus controlled by said input circuit in accordance with said indication of the number of sets in the entry to operate on a start-stop basis for recording said sequentially arranged coded signals from said second delay circuit, said second delay circuit comprising a plurality of timing circuits arranged in tandem, means controlled by said first delay circuit for sequentially initiating the operation of said timing circuits, and a plurality of gate circuits connected to said recording apparatus and controlled by said timing circuits and said sets of coded signals from said first delay circuit.

9. A start-stop recording device in accordance with claim 8 wherein said timing circuits are single-shot multivibrator circuits.

10. A start-stop recording device comprising an input circuit for simultaneously providing sets of coded signals; a first delay circuit connected to said input circuit for sequentially arranging said sets of coded signals; a second delay circuit connected to and controlled by said first delay circuit for sequentially arranging the coded signals in each of said sets; and recording apparatus controlled by said input circuit and by said second delay circuit for sequentially recording said sets of coded signals simultaneously provided by said input circuit, said second delay circuit comprising a plurality of single shot multivibrator timing circuits arranged in tandem, means controlled by said first delay circuit for sequentially initiating the operation of said timing circuits and a plurality of gate circuits connected to said recording apparatus and controlled by said timing circuits and said sets of coded signals from said first delay circuit, said timing circuits completing a cycle of operation for each set of coded signals provided by said first delay device to said gate circuits, said recording apparatus comprising a clutch mechanism controlled by said input circuit, a recording coil controlled by said gate circuits, and a movable magnetic surface positioned adjacent said recording coil and controlled by said clutch mechanism.

11. In combination a magnetic delay device comprising a closed loop magnetic tape; a plurality of pick-up coils positioned adjacent said tape; means for continuously moving said tape at a constant rate; a spot coil positioned adjacent said moving tape for applying a magnetic signal on said tape; a plurality of response circuits connected respectively to said pick-up coils and sequentially controlled by the signals induced in said coils as said magnetic signal on said tape passes adjacent said pick-up coils; an input circuit directly connected to said response circuits and said spot coil controlling the energization of said spot coil and providing a set of coded signals; an erase coil positioned adjacent said moving tape for erasing said magnetic signal after said magnetic signal has passed adjacent all of said pick-up coils, apparatus for recording said signals from said response circuit, and means responsive to said input circuit to operate said recording apparatus at the initiation of said signals and to disable said recording apparatus at the completion of said signal.

12. A magnetic delay device comprising a closed loop magnetic tape; a plurality of pick-up coils positioned adjacent said tape; means for continuously moving said tape at a constant rate; a spot coil positioned adjacent said moving tape for applying a magnetic signal on said tape; a plurality of response circuits connected respectively to said pick-up coils sequentially controlled by the signals induced in said coils as said magnetic signal on said tape passes adjacent said pick-up coils; an input circuit connected to said response circuits and said spot coil controlling the energization of said spot coil and an erase coil positioned adjacent said moving tape for erasing said magnetic signal after said magnetic signal has passed adjacent all of said pick-up coils, and a recording device operated under control of said input circuit on a start-stop basis for recording said sequentially arranged signals from said response circuits, said response circuits comprising gas tubes connected respectively to said pick-up coils, relay devices controlled by two adjacent ones of said gas tubes, and potential sources connectable by said relay devices to said input circuit.

13. A magnetic recording system comprising an input circuit for providing information to be recorded; a continuous magnetic surface; a plurality of signal coils positioned adjacent said surface; means for providing unvarying relative motion between said surface and said signal coils; magnetic means for providing a signal on said surface at a fixed distance from the first of said signal coils; circuit means connected to said signal coils and selectively responsive to potentials induced in said signal coils by said signal; means for simultaneously and selectively conditioning said circuit means for response to the potentials induced in said signal coils; output recording means controlled by said circuit means; and control means associated with said recording means and responsive to the presence of said information for starting and readying said recording means before the operation of said circuit means.

14. A magnetic recording system comprising a continuous magnetic surface; a plurality of signal coils positioned adjacent said surface; means for providing an unvarying relative motion between said surface and said signal coils; magnetic means for providing a signal on said surface at a fixed distance from the first of said signal coils; circuit means connected to said signal coils and selectively responsive to potentials induced in said signal coils by said signal; means for simultaneously and selectively conditioning said circuit means for response to the potentials induced in said signal coils; start-stop output recording means controlled by said circuit means comprising an accelerating device, a recording medium controlled by said accelerating device, a recording device positioned adjacent said recording medium and controlled by said circuit means, and means including said first and second-mentioned means, and said accelerating device for accelerating said recording medium from standstill to recording speed before the operation of said recording device.

15. In a signal translating apparatus, the combination of means for simultaneously providing a plurality of sets of coded signals; and signal scanning means comprising a magnetic delay device controlled by said providing means, a series of gating devices conductive successively at exclusive intervals, means controlled upon operation of said magnetic delay device for initiating the progressive operation of said devices, means for initiating pulse time modulation signals from said gating means in accordance with the plurality of sets of conditions from said providing means upon operation of said scanning means, a device for recording said pulse time modulation signals, and means controlled by said providing means for operating said recording device on a start-stop basis.

16. In a signal translating apparatus in accordance with claim 15 wherein said magnetic delay device comprises a continuously rotating magnetic medium, means controlled by said providing means and positioned adjacent said medium for magnetically spotting said medium, and pick-up means positioned adjacent said medium at a predetermined delay distance from said magnetically spotting means.

17. In a signal recording device, an input channel for simultaneously providing a plurality of sets of coded signals and a start signal, a first timing means responsive to said start signal for sequentially arranging said sets of coded signals, recording means, a temporary storage device for receiving said sequentially arranged sets of coded signals, means associated with said temporary storage device for supplying said sets of signals to said recording means so that said signals representing each of said sequentially arranged sets may be sequentially recorded, and control means responsive to said start signal for starting and readying said recording means.

References Cited in the file of this patent

UNITED STATES PATENTS

| | | |
|---|---|---|
| 2,364,210 | Guanella | Dec. 5, 1944 |
| 2,594,495 | Retallock | Apr. 29, 1952 |
| 2,656,524 | Gridley et al. | Oct. 20, 1953 |
| 2,675,427 | Newby | Apr. 13, 1954 |